United States Patent [19]

Costello et al.

[11] Patent Number: 4,460,477

[45] Date of Patent: Jul. 17, 1984

[54] USE OF A CARBOXYLIC FUNCTIONAL POLYAMPHOLYTE TO INHIBIT THE PRECIPITATION AND DEPOSIT OF SCALE IN AQUEOUS SYSTEMS

[75] Inventors: Christine A. Costello, Coraopolis; Gary F. Matz, Pitcairn, both of Pa.

[73] Assignee: Calgon Corporation, Pittsburgh, Pa.

[21] Appl. No.: 411,174

[22] Filed: Aug. 25, 1982

[51] Int. Cl.$^3$ ............................................. C02F 5/10
[52] U.S. Cl. .................................. 210/701; 252/180
[58] Field of Search ........................... 210/698–701; 252/180, 181

[56] References Cited

U.S. PATENT DOCUMENTS

| 3,085,916 | 4/1963 | Zimmie et al. | 210/698 |
| 3,752,761 | 8/1973 | Boothe et al. | 252/180 |
| 4,029,577 | 6/1977 | Godlewski et al. | 210/701 |
| 4,164,521 | 8/1979 | Goodman | 210/701 |
| 4,209,398 | 6/1980 | Ii et al. | 252/181 |
| 4,271,058 | 6/1981 | Trabitzsch et al. | 210/701 |
| 4,357,207 | 11/1982 | Yorkei | 210/698 |

FOREIGN PATENT DOCUMENTS 2026517  2/1980  United Kingdom ............... 252/180

*Primary Examiner*—Peter A. Hruskoci
*Attorney, Agent, or Firm*—R. Brent Olson; Michael C. Sudol, Jr.

[57] ABSTRACT

The instant invention is directed to a method of inhibiting the precipitation and deposition of scale in an aqueous system comprising adding an effective amount, preferably at least 0.1 ppm, of a carboxylic functional polyampholyte, or the salt thereof, to said aqueous system.

8 Claims, No Drawings

USE OF A CARBOXYLIC FUNCTIONAL POLYAMPHOLYTE TO INHIBIT THE PRECIPITATION AND DEPOSIT OF SCALE IN AQUEOUS SYSTEMS

BACKGROUND OF THE INVENTION

Generally, scale deposits are incrustation coatings which may be formed from a wide variety of simple and complex inorganic salts which accumulate on the metallic surfaces of a water-carrying system through a number of different causes. While the method and compositions of the present invention have been found particularly useful in providing inhibition of calcium phosphate scales, inhibition of magnesium hydroxide, calcium fluoride, calcium carbonate, calcium sulfate and other common scales may also be obtained. Various industrial and commercial water-carrying systems are subject to scale formation problems. Scale is of particular concern in heat exchange systems employing water, such as, for example, boiler systems, and once-through and open recirculating water cooling systems.

The water employed in these systems ordinarily will contain a number of dissolved salts, the amount and nature of which will, of course, depend upon the source of the water employed. Thus, the water usually contains alkylene earth metal cations, primarily calcium and magnesium, and such anions as bicarbonate, carbonate, sulfate, silicate, phosphate, oxalate, fluoride, and so forth. Combination products of these anions and cations will precipitate from the water in which they are carried to form scale deposits when the concentration of the anion and cation comprising the combination or reaction product exceed the solubility of the reaction product. Thus, when the concentrations of calcium ion and phosphate ion exceed the solubility of the calcium phosphate reaction product, a solid phase of calcium phosphate will form as a precipitate. Precipitation of the reaction product will continue until the solubility product concentrations of the constituent ions are no longer exceeded.

Numerous factors may be responsible for producing a condition of supersaturation for a particular reaction product. Among such factors are changes in the pH of the water system, evaporation of the water phase, rate of heat transfer, amount of dissolved solids, and changes in the temperature or pressure of the system.

For boiler systems and similar heat exchange systems, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. As a result, the solubility of the scale-forming salt reaction product is first exceeded in this thin film, and crystallization of scale results directly on the heating surface.

In addition to this, a common source of scale in boiler systems is the breakdown of calcium bicarbonate to form calcium carbonate and magnesium hydroxide, water and carbon dioxide under the influence of heat. For open recirculating cooling water systems, in which a cooling tower, spray pond, evaporative condenser, and the like serve to dissipate heat by evaporation of water, the chief factor which promotes scale formation is concentration of solids dissolved in water by repeated evaporation of portions of the water phase. Thus, even a water which is not scale forming on a once-through basis usually will become scale forming when concentrated two, four, or six times. The formation of scale deposits poses a serious problem in a number of regards. The different types of scale which are formed all possess a low degree of heat conductivity. Thus, a scale deposit is essentially an insulating layer imposed across the path of heat travel from whatever source to the water of the system. In the case of a boiler system, the retarded heat transfer causes a loss in boiler efficiency. Further, the heat insulating scale layer inhibits the normal coolant effect of the boiler water resulting in the boiler tube metal approaching the temperature of the fireside. This results in the tube metal reaching a sufficiently high temperature to cause tube burn-out. In addition to this problem, scale formation facilitates corrosive processes, and a substantial scale deposit will interfere materially with fluid flow. Consequently, scale is an expensive problem in many industrial water systems, causing delays and shutdowns for cleaning and removal.

DESCRIPTION OF THE INVENTION

The instant invention is directed to a method of inhibiting the precipitation and deposition of scale in an aqueous system comprising adding an effective amount, preferably at least 0.1 ppm of a carboxylic functional polyampholyte, or the salt thereof, to said aqueous system.

Any carboxylic functional polyampholyte, or the salt thereof, may be used. A polyampholyte is a polymer containing anionic, cationic and optionally nonionic mer units. The anionic mer unit contains the carboxyl group.

Although any carboxylic functional polyampholyte may be used, it is preferably prepared from:
(i) at least one carboxylic functional monomer of the formula:

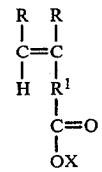

wherein
R, which may be the same or different, is hydrogen, a phenyl, as alkyl group of from 1 to 3 carbon atoms, preferably hydrogen, methyl or ethyl, or a —COOX group,
$R^1$ is a straight or branched chain of from 0 to 12 carbon atoms, preferably 0 to 3, and
X is hydrogen or an alkali or alkaline earth metal, preferably hydrogen, sodium, potassium or cesium;
(ii) at least one cationic-containing monomer; and
(iii) optionally, non-ionic monomer.

Any carboxylic functional monomer, or its salt, may be used. Examples include acrylic acid, crotonic acid, methacrylic acid, vinyl acetic acid, allylacetic acid, 4-methyl-4-pentenoic acid and dicarboxylic acids, such as maleic acid and itaconic acid. The preferred carboxylic functional monomers are acrylic acid and methacrylic acid. Mixtures of carboxylic functional monomers may be used in preparing the polyampholyte.

Any cationic-containing monomer may be used. The preferred cationic-containing monomers are:

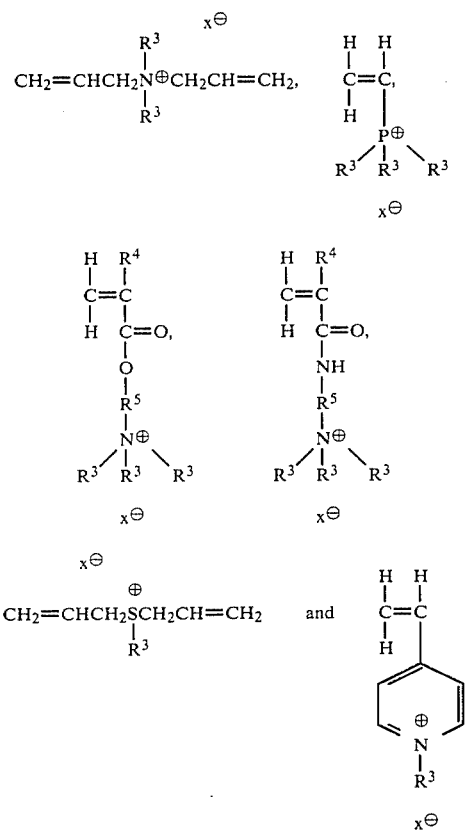

wherein
- $R^3$ is hydrogen, a phenyl, or an alkyl group of from 1 to 3 carbon atoms;
- $R^4$ is a hydrogen or an alkyl group of from 1 to 3 carbon atoms, preferably a hydrogen or methyl group,
- $R^5$ is a straight or branched chain of from 1 to 12 carbon atoms, preferably 1 to 3 carbon atoms; and
- X is an anion, preferably a halogen or alkyl sulfate.

X may be any anion in the above formula. Examples include halogen, sulfate, sulfonate, phosphate, hydroxide, borate, cyanide, carbonate, thiocyanate, thiosulfate, isocyanate, sulfite, bisulfite, nitrate, nitrite, oxalate, silicate, sulfide, cyanate, acetate and other common inorganic and organic ions.

Specific examples of the most preferred cationic-containing monomers include diethyldiallyl ammonium chloride, dimethyldiallyl ammonium chloride, methacryloyloxy ethyl trimethyl ammonium methylsulfate and methacrylamido propyl trimethyl ammonium chloride. Mixtures of cationic-containing monomers may be used in preparing the polyampholyte.

The polyampholyte may also be prepared by polymerizing a monomer containing a tertiary amine as the pendant group with subsequent quaternization of the nitrogen in the polymer to form the cationic mer units. Likewise, sulfur and phosphorus-containing monomers may be exhaustively methylated to form cations.

One or more non-ionic monomers may optionally be used. Examples include: acrylamide, and its derivatives, such as methacrylamide, and N,N-dimethyl acrylamide; acrylonitrile; vinyl acetate; vinyl pyridine; hydroxyalkyl acrylates; methacrylate, and its derivatives; butadiene; styrene, and its derivatives, including substituted styrenes; hydroxyesters of olefinic carboxylic acids; alkylene oxides; divinyl ketones; vinyl ketones; divinyl ethers and alkyl vinyl ethers. The preferred non-ionic monomer is acrylamide. Mixtures of non-ionic monomers may be used in preparing the polyampholyte.

The most preferred carboxylic functional polyampholytes are terpolymers prepared from:

(i) a carboxylic functional monomer of the formula:

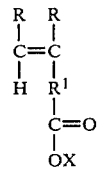

wherein
- R, which may be the same or different, is hydrogen, a phenyl or an alkyl group of from 1 to 3 carbon atoms, preferably hydrogen, methyl or ethyl,
- $R^1$ is a straight or branched chain of from 0 to 12 carbon atoms, preferably 0 to 3, and
- X is hydrogen or an alkali or alkaline earth metal, preferably hydrogen, sodium, potassium or cesium;

(ii) a monomer of the formula:

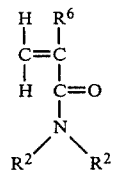

wherein
- $R^6$ is hydrogen, a phenyl or an alkyl group of from 1 to 3 carbon atoms, preferably a hydrogen, methyl, or ethyl, and
- $R^2$, which may be the same or different, is a hydrogen, or an alkyl group of from 1 to 3 carbon atoms; and (iii) a cationic-containing monomer containing an ion selected from the group consisting of a quaternary ammonium, phosphonium or sulfonium.

The polymer may be produced from any ratio of the monomers. It is preferred that the polymer be prepared from 5 to 90%, most preferably 22.5 to 70%, by weight, carboxylic functional monomer; 0.5 to 85%, most preferably 2.5 to 25%, by weight, cationic monomer; and 0 to 85%, more preferably 1.5 to 85%, and most preferably 5 to 67.5%, by weight, non-ionic monomer. A higher percent of non-ionic monomer may be used, and subsequently hydrolyzed to a sufficient extent that the final percent is in the preferred range. Likewise, a copolymer may be prepared from non-ionic monomer and cationic monomer with subsequent hydrolysis of the non-toxic monomer to form the anionic portion, e.g. acrylamide can be hydrolyzed to form acrylic acid.

The term "aqueous", as used herein, is intended to include water in any physical state and to include water in which is dissolved or dispersed any substance, for example, inorganic salts in brine or seawater.

The treatment concentration of the polyampholyte employed in the present invention to inhibit scale deposit and formation is generally at least 0.1 ppm, preferably 0.1 to 500 ppm by weight of the total solution of the water-carrying system being treated. Preferably, the concentration level range will be from about 1.0 to 200 ppm.

The polyampholyte polymers may be prepared by mixing the monomers preferably in the presence of a free radical initiator. Any free radical initiator may be used. Examples include peroxides, azo initiators and redox systems. The preferred catalysts are sodium persulfate or a mixture of ammonium persulfate and any azo type initiator, such as 2,2'-azobis-(2,4-dimethyl-4-methoxyvaleronitrile). The polymerization may also be initiated photochemically.

The polyampholyte may be made by any of a variety of procedures, for example, in solution, suspension, bulk and emulsions.

The temperature is not critical. The reaction will generally occur between 10° and 100° C., preferably 40° to 60° C. It is generally impractical to run the reaction below room temperature because the reaction is too slow. Above a temperature of 60° C., the molecular weight of the polymer tends to decrease. The reaction, depending on the temperature, generally takes from 1 to 12 hours. Measuring for residual monomer will verify when the reaction is complete.

The pH of the reaction mixture is not critical. The pH is generally in the range of 4.5 to 9.0.

The molecular weight of ampholytic polymers is difficult to accurately measure. The polymers are instead, usually identified by intrinsic viscosity. The intrinsic viscosity of the polyampholyte is not critical in the instant invention. The preferred intrinsic viscosity is 0.05 to 4.3, most preferably 0.4 to 4.3 dl/g. in 1.0M sodium chloride (measured on a 75 Cannon Ubbelohde capillary viscometer). In seawater applications, polymers with an intrinsic viscosity of 2.8 or above were found ineffective.

EXAMPLES

The polymers of the Examples were produced by mixing the cationic, anionic and optionally nonionic monomers in the amounts indicated in Tables I through V, at 30% solids concentration, initial temperature of 50° C., and pH of 4.5. The monomer mix was purged with nitrogen for one hour. The solvent was deionized water. Initiator in an amount 0.003 moles sodium persulfate/mole monomer mix was added and the components allowed to react for about three hours.

EXAMPLES 1–23

$CaPO_4$ inhibition was tested using 250 mg/l $Ca^{++}$ and 6.0 mg/l $PO_4^=$ with 10 ppm of inhibitor, at a pH of 8.5 and at 60° C. for 24 hours. The percent inhibition was determined by measuring the $PO_4^=$ concentration in solution before and after the 24 hour period.

TABLE I

| Example | Anionic Monomer | Wt % | Cationic Monomer | Wt % | Non-ionic Monomer | Wt % | Intrinsic Viscosity [n] in 1.0M NaCl | % Inhibition |
|---|---|---|---|---|---|---|---|---|
| 1 | AA[1] | 70.0 | DMDAAC[2] | 25.0 | AM[3] | 5.0 | 4.30 | 10 |
| 2 | AA | 70.0 | DMDAAC | 10.0 | AM | 20.0 | 2.80 | 40 |
| 3 | AA | 62.5 | DMDAAC | 17.5 | AM | 20.0 | 3.30 | 80 |
| 4 | AA | 62.0 | DMDAAC | 25.0 | AM | 35.0 | 1.90 | 60 |
| 5 | AA | 55.0 | DMDAAC | 25.0 | AM | 20.0 | 2.20 | 5 |
| 6 | AA | 55.0 | DMDAAC | 10.0 | AM | 35.0 | 2.20 | 90 |
| 7 | AA | 50.0 | DMDAAC | 12.0 | AM | 38.0 | 1.70 | 90 |
| 8 | AA | 50.0 | DMDAAC | 8.0 | AM | 42.0 | 0.93 | 90 |
| 9 | AA | 47.5 | DMDAAC | 17.5 | AM | 35.0 | 1.60 | 95 |
| 10 | AA | 47.5 | DMDAAC | 2.5 | AM | 50.0 | 1.80 | 90 |
| 11 | AA | 44.0 | DMDAAC | 12.0 | AM | 44.0 | 1.54 | 90 |
| 12 | AA | 44.0 | DMDAAC | 8.0 | AM | 48.0 | 0.91 | 95 |
| 13 | AA | 40.0 | DMDAAC | 10.0 | AM | 50.0 | 1.60 | 90 |
| 14 | AA | 32.5 | DMDAAC | 17.5 | AM | 50.0 | 1.00 | 90 |
| 15 | AA | 32.5 | DMDAAC | 2.5 | AM | 65.0 | 1.30 | 95 |
| 16 | AA | 67.5 | DMDAAC | 10.0 | HPA[4] | 22.5 |  | 92 |
| 17 | AA | 22.5 | DMDAAC | 10.0 | HPA | 67.5 |  | 78 |
| 18 | AA | 67.5 | DMDAAC | 10.0 | HPA | 22.5 |  | 85 |
| 19 | AA | 22.5 | DMDAAC | 10.0 | HPA | 67.5 |  | 92 |
| 20 | AA | 35.0 | MAPTAC[5] | 10.0 | AM | 55.0 | 0.5 | 100 |
| 21 | AA | 30.0 | VTPPB[6] | 20.0 | AM | 50.0 | 0.4 | 94 |
| 22 | AA | 30.0 | METAMS[7] | 10.0 | AM | 60.0 | 0.84 | 100 |
| 23 (Comp.) | AMPS[8] | 39.0 | DMDAAC | 11.0 | AM | 50.0 | 0.57 | 0 |

[1]AA = acrylic acid
[2]DMDAAC = dimethyldiallyl ammonium chloride
[3]AM = acrylamide
[4]HPA = hydroxypropyl acrylate
[5]MAPTAC = methacrylamidopropyl trimethyl ammonium chloride
[6]VTPPB = vinyl triphenyl phosphonium bromide
[7]METAMS = methacryloyloxyethyl trimethyl ammonium methylsulfate
[8]AMPS = 2-acrylamido-2-methylpropane sulfonic acid

EXAMPLES 24–31

The polymers were prepared as outlined above, with the addition of various amounts of chain transfer agent, isopropyl alcohol. The percent inhibition of $CaPO_4$ was measured using 2.5 ppm and 5 ppm inhibitor, by the method outlined in Examples 1–23. The results are reported in Table II.

TABLE II

Acrylic Acid/DMDAAC[1]/Acrylamide 47/10/43

| Example | % IPA[2] | Intrinsic Viscosity [n] | % Inhibition 2.5 ppm | % Inhibition 5 ppm |
|---|---|---|---|---|
| 24 | 1.5 | 1.1 | 25 | 100 |
| 25 | 2.0 | 0.9 | — | 30 |
| 26 | 2.5 | 0.9 | 25 | 100 |
| 27 | 3.0 | 0.9 | 20 | 100 |
| 28 | 3.5 | 0.8 | 0 | 100 |

TABLE II-continued

Acrylic Acid/DMDAAC[1]/Acrylamide 47/10/43

| Example | % IPA[2] | Intrinsic Viscosity [n] | % Inhibition 2.5 ppm | % Inhibition 5 ppm |
|---|---|---|---|---|
| 29 | 5.0 | 1.4 | 70 | 100 |
| 30 | 10.0 | 1.0 | 25 | 100 |
| 31 | 15.0 | 0.6 | 30 | 100 |

[1]DMDAAC = dimethyldiallyl ammonium chloride
[2]IPA = isopropyl alcohol

EXAMPLES 32-40

Steam was passed through a metal U tube to maintain the temperature at −240° F. The U tube was immersed in a cylindrical cell. Seawater, with a concentration factor of 1.6 times normal seawater, (pH 8.2) was passed through the cell at a rate of 600 ml/hr. After 24 hours, the scale deposited on the U tube was removed, weighed and analyzed. The effectiveness is reported as % inhibition, defined by the equation:

$$\% \text{ inhibition} = \frac{\text{blank scale rate} - \text{inhibition scale rate}}{\text{blank scale rate}} \times 100.$$

The scaling rates were determined by the equation:

$$\text{scale rate} = \frac{\text{weight of scale on tube (mg)}}{\text{test volume throughput (l)}}.$$

The % inhibition of various scale inhibitor mixtures is indicated in Table III.

TABLE III

| Example | Cationic Monomer | Wt % | Anionic Monomer | Wt % | Non-Ionic Monomer | Wt % | Intrinsic Viscosity | ppm Active | Inhibition |
|---|---|---|---|---|---|---|---|---|---|
| 32 | DMDAAC[1] | 10 | acrylic acid | 47 | acrylamide | 43 | .38 | 5 | 85% |
| 33 | DMDAAC | 10 | acrylic acid | 47 | acrylamide | 43 | .36 | 5 | 95% |
| 34 | DMDAAC | 10 | acrylic acid | 70 | acrylamide | 20 | .30 | 5 | 76% |
| 35 | DMDAAC | 10 | acrylic acid | 70 | acrylamide | 20 | .23 | 5 | 70% |
| 36 | DMDAAC | 10 | acrylic acid | 47 | acrylamide | 43 | .36 | 2.5 | 79% |
| 37 | DMDAAC | 10 | acrylic acid | 47 | acrylamide | 43 | .36 | 7.5 | 78% |
| 38 | DMDAAC | 10 | acrylic acid | 47 | acrylamide | 43 | 2.0 | 5 | 62% |
| 39 | DMDAAC | 10 | acrylic acid | 70 | acrylamide | 20 | 2.8 | 5 | 0% (90% increase) |
| 40 | DMDAAC | 25 | acrylic acid | 70 | acrylamide | 5 | 4.3 | 5 | 0% (70% increase) |

[1]DMDAAC = dimethyldiallyl ammonium chloride

EXAMPLES 41-56

A terpolymer of 47% acrylic acid/10% dimethyldiallyl ammonium chloride/43% acrylamide having an intrinsic viscosity in 1.0M NaCl of 0.55, was added in the amount indicated in Table V to samples of synthetic boiler water containing varying amounts of $PO_4^=$, $OH^-$, $SiO_2$, $Mg^{++}$ and chelant (sodium nitrilotriacetic acid). Each Example was tested under three conditions, without any terpolymer, with 1 mg/l and with 10 mg/l of terpolymer. The mixtures were heated to 90° C. and held at that temperature throughout the tests. The pH was maintained at 10 to 12. Each sample was observed after 1 hour, 4 or 5 hours, and 21 or 22 hours. The observations are described in Table V. Test test is used to predict the effectiveness of the inhibitors in boiler water systems. Under the observation rankings, A is the most preferred results, whereas F is the least preferred result.

TABLE IV

| | Dosage (mg/l) | | | | | Observations | | | | | | | | |
|---|---|---|---|---|---|---|---|---|---|---|---|---|---|---|
| | | | | | | No inhibitor | | | terpolymer (1 mg/l) | | | terpolymer (10 mg/l) | | |
| Example | Na₃HTA | PO₄= | OH⁻ | SiO₂ | Mg++ | 1 hr. | 4 hrs. | 21 hrs. | 1 hr. | 5 hrs. | 22 hrs. | 1 hr. | 5 hrs. | 22 hrs. |
| 41 | 56 | 50 | 500 | 100 | 10 | F | F | F | F | F | F | A | D | D |
| 42 | 56 | 5 | 500 | 100 | 10 | F | F | F | F | F | F | D | E | E |
| 43 | 56 | 50 | 50 | 100 | 10 | F | F | F | E | E | F | A | A | A |
| 44 | 56 | 5 | 50 | 100 | 10 | F | F | F | E | F | F | A | A | A |
| 45 | 56 | 50 | 500 | 10 | 10 | B | B/C | B/C | C | C | C | A | A | A |
| 46 | 56 | 5 | 500 | 10 | 10 | B | B/C | B/C | C | C | C | A | A | A |
| 47 | 56 | 50 | 50 | 10 | 10 | B/C | C | C | C | C | C | A | A | A |
| 48 | 56 | 5 | 50 | 10 | 10 | C | C | F | E | E | E | A | A | A |
| 49 | 5.6 | 50 | 500 | 100 | 1 | D | D | D | A | A | A | A | A | A |
| 50 | 5.6 | 5 | 500 | 100 | 1 | C | C | F | A | A | A | A | A | A |
| 51 | 5.6 | 50 | 50 | 100 | 1 | A | A | A | A | A | A | A | A | A |
| 52 | 5.6 | 5 | 50 | 100 | 1 | A | A | C | A | A | A | A | A | A |
| 53 | 5.6 | 50 | 500 | 10 | 1 | A | B | B | A | A | A | A | A | A |
| 54 | 5.6 | 5 | 500 | 10 | 1 | A | B | B | A | A | A | A | A | A |
| 55 | 5.6 | 50 | 50 | 10 | 1 | A | A | A | A | A | A | A | A | A |
| 56 | 5.6 | 5 | 50 | 10 | 1 | A | A | A | A | A | A | A | A | A |

A clear
B small particulates dispersed throughout the mixture
C small particulates settled on the bottom
D particulates agglomerated on the bottom to the size of a small cotton ball
E particulates agglomerated on the bottom to the size of a medium cotton ball
F particulates agglomerated on the bottom to the size of a large cotton ball

EXAMPLES 57-72

Zeta potential is a measure of particle surface charge at the particle/water shear surface. An effective inhibitor will increase the charge, thus increasing the repulsive forces between particles. This will increase the dispersibility of the particles and decrease the coagulation, precipitation and subsequent scaling.

The zeta potentials of magnitite (iron oxide) particles and of calcium carbonate and magnetite in a 70/30 weight blend were determined for 1,000 mg/l suspensions in deionized water at varying pHs. 0.5 ppm and 5 ppm of various polymers were added to the suspensions and the zeta potential was remeasured. The change in the zeta potential after inhibitor addition, or zeta potential increase, is noted in Table V. When the zeta potential increased, more stable suspensions were created. Mixed deposits of magnetite and calcium carbonate are particularly typical of deposits found in many gas scrubbing systems.

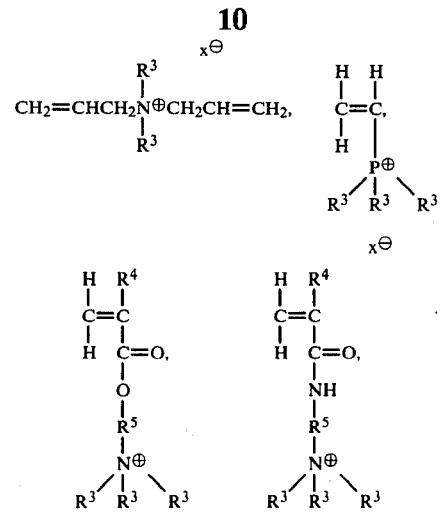

TABLE V

| Example | Polymer (wt %)/Intrinsic Viscosity | Concentration (ppm) | pH | Beta Potential Increase (mV) Magnetite | 70/30 Calcium Carbonate/ Magnetite |
|---|---|---|---|---|---|
| 57 | 47.5% AA[1]/17.5% DMDAAC[2]/35% AM[3] ($\eta$ = 1.60) | 5.0 | 8 | −0.2 | 21.5 |
| 58 | 47.5% AA[1]/17.5% DMDAAC[2]/35% AM[3] ($\eta$ = 1.60) | 5.0 | 10 | 3.5 | 15.0 |
| 59 | 47.5% AA[1]/17.5% DMDAAC[2]/35% AM[3] ($\eta$ = 1.60) | 0.5 | 8 | 1.4 | 24.5 |
| 60 | 47.5% AA[1]/17.5% DMDAAC[2]/35% AM[3] ($\eta$ = 1.60) | 0.5 | 10 | −1.6 | 11.9 |
| 61 | 70% AA/25% DMDAAC/5% AM ($\eta$ = 4.3) | 5.0 | 8 | 11.1 | 21.4 |
| 62 | 70% AA/25% DMDAAC/5% AM ($\eta$ = 4.3) | 5.0 | 10 | 11.4 | 27.4 |
| 63 | 70% AA/25% DMDAAC/5% AM ($\eta$ = 4.3) | 0.5 | 8 | 2.1 | 27.2 |
| 64 | 70% AA/25% DMDAAC/5% AM ($\eta$ = 4.3) | 0.5 | 10 | 1.6 | 26.8 |
| 65 | 70% AA/10% DMDAAC/20% AM ($\eta$ = 2.80) | 5.0 | 8 | 10.2 | 31.9 |
| 66 | 70% AA/10% DMDAAC/20% AM ($\eta$ = 2.80) | 5.0 | 10 | 8.6 | 41.4 |
| 67 | 70% AA/10% DMDAAC/20% AM ($\eta$ = 2.80) | 0.5 | 8 | 3.4 | 27.2 |
| 68 | 70% AA/10% DMDAAC/20% AM ($\eta$ = 2.80) | 0.5 | 10 | 7.4 | 38.1 |
| 69 | 85% AA/5% DMDAAC/10% AM ($\eta$ = .85) | 5.0 | 8 | 9.1 | 36.9 |
| 70 | 85% AA/5% DMDAAC/10% AM ($\eta$ = .85) | 5.0 | 10 | 13.4 | 39.0 |
| 71 | 85% AA/5% DMDAAC/10% AM ($\eta$ = .85) | 0.5 | 8 | 5.9 | 39.1 |
| 72 | 85% AA/5% DMDAAC/10% AM ($\eta$ = .85) | 0.5 | 10 | 6.6 | 32.5 |

[1]AA = acrylic acid.
[2]DMDAAC = dimethyldiallylammonium chloride.
[3]AM = acrylamide.

What is claimed is:
1. A method of inhibiting the precipitation and deposition of calcium phosphate in an aqueous system comprising adding to the aqueous system at least 0.1 ppm, of a carboxylic functional polyampholyte, or the salt thereof, having an intrinsic viscosity of 0.05 to 4.3 dl/g measured in 1.0M sodium chloride, prepared from:
(i) 22.5 to 90%, by weight, of at least one carboxylic functional monomer of the formula:

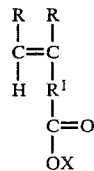

wherein
R, which may be the same or different, is hydrogen or an alkyl group of from 1 to 3 carbon atoms,
R[1] is a straight or branched chain of from 0 to 3 carbon atoms, and
X is hydrogen or an alkali or alkaline earth metal;
(ii) 2.5 to 20%, by weight, of at least one cationic-containing monomer selected from the group consisting of:

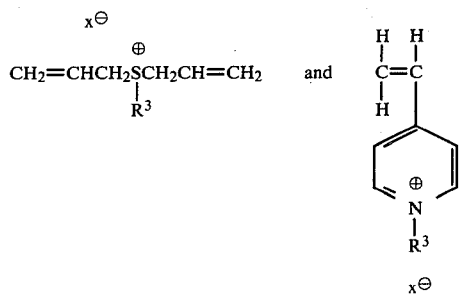

wherein
R[3] is hydrogen, or an alkyl group of from 1 to 3 carbon atoms,
R[4] is a hydrogen or an alkyl group of from 1 to 3 carbon atoms,
R[5] is a straight or branched chain of from 1 to 12 carbon atoms, and
X is an anion; and
(iii) 5 to 67.5%, by weight, of at least one non-ionic monomer of the formula:

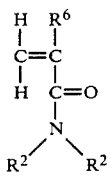

wherein

R⁶ is hydrogen, a phenyl or an alkyl group of from 1 to 3 carbon atoms,

R², which may be the same or different, is a hydrogen, or an alkyl group of from 1 to 3 carbon atoms.

2. The method of claim 1, wherein said polyampholyte is prepared from:

(i) 22.5 to 70%, by weight, of said carboxylic functional monomer;

(ii) 2.5 to 17.5%, by weight, of said cationic-containing monomer; and (iii) 5 to 67.5%, by weight, of said non-ionic monomer.

3. The method of claim 1, wherein said carboxylic functional monomer is acrylic acid; said non-ionic, monomer is selected from the group consisting of acrylamide, methacrylamide N,N-dimethyl acrylamide and hydroxypropyl acrylate; and said cationic-containing monomer is selected from the group consisting of diethyldiallyl ammonium chloride, dimethyldiallyl ammonium chloride, methacryloyloxy ethyl trimethyl ammonium, methylsulfate and methacrylamido propyl trimethyl ammonium chloride.

4. The method of claim 1, wherein said carboxylic functional polyampholyte is a terpolymer.

5. The method of claim 1, wherein said aqueous system is a cooling water system.

6. The method of claim 1, wherein said aqueous system is a boiler water system.

7. The method of claim 1, wherein said aqueous system is a desalination system and said polyampholyte has an intrinsic viscosity above 0.05 but below 2.8 dl/g in 1.0M sodium chloride.

8. The method of claim 1, wherein said aqueous system is a gas scrubber system.

* * * * *

UNITED STATES PATENT OFFICE
CERTIFICATE OF CORRECTION

Patent No. 4,460,477          Dated July 17, 1984

Inventor(s) Christine A. Costello and Gary F. Matz

It is certified that error appears in the above-identified patent and that said Letters Patent are hereby corrected as shown below:

At Column 4, line 63, "non-toxic" should read --non-ionic--.

Signed and Sealed this

Eighteenth Day of December 1984

[SEAL]

Attest:

Attesting Officer

GERALD J. MOSSINGHOFF

Commissioner of Patents and Trademarks